No. 840,755. PATENTED JAN. 8, 1907.
B. J. DETRICK & I. A. WEAVER.
DRAFT EQUALIZER.
APPLICATION FILED SEPT. 19, 1906.
2 SHEETS—SHEET 2.
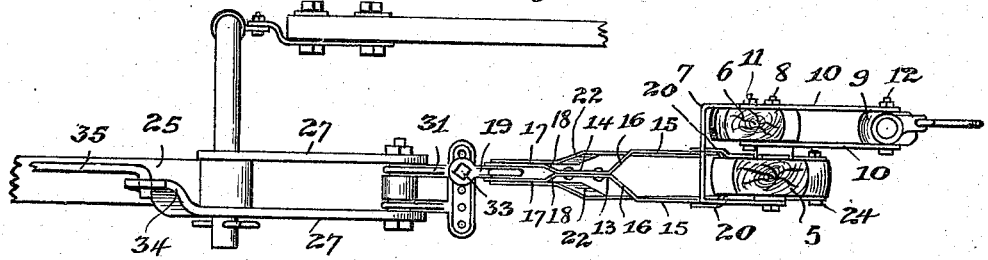
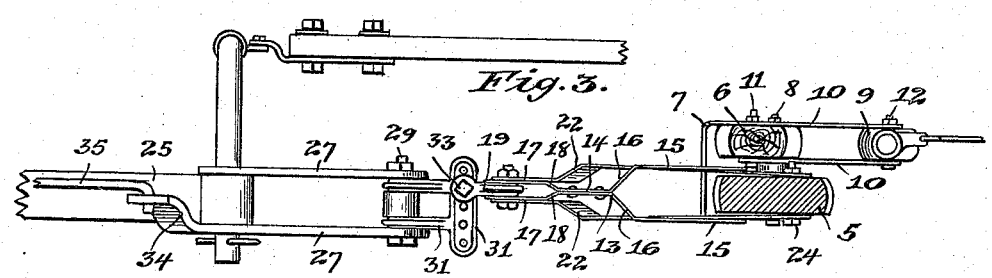
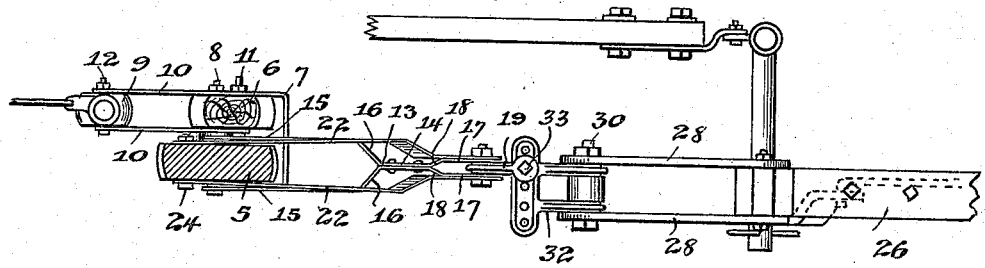

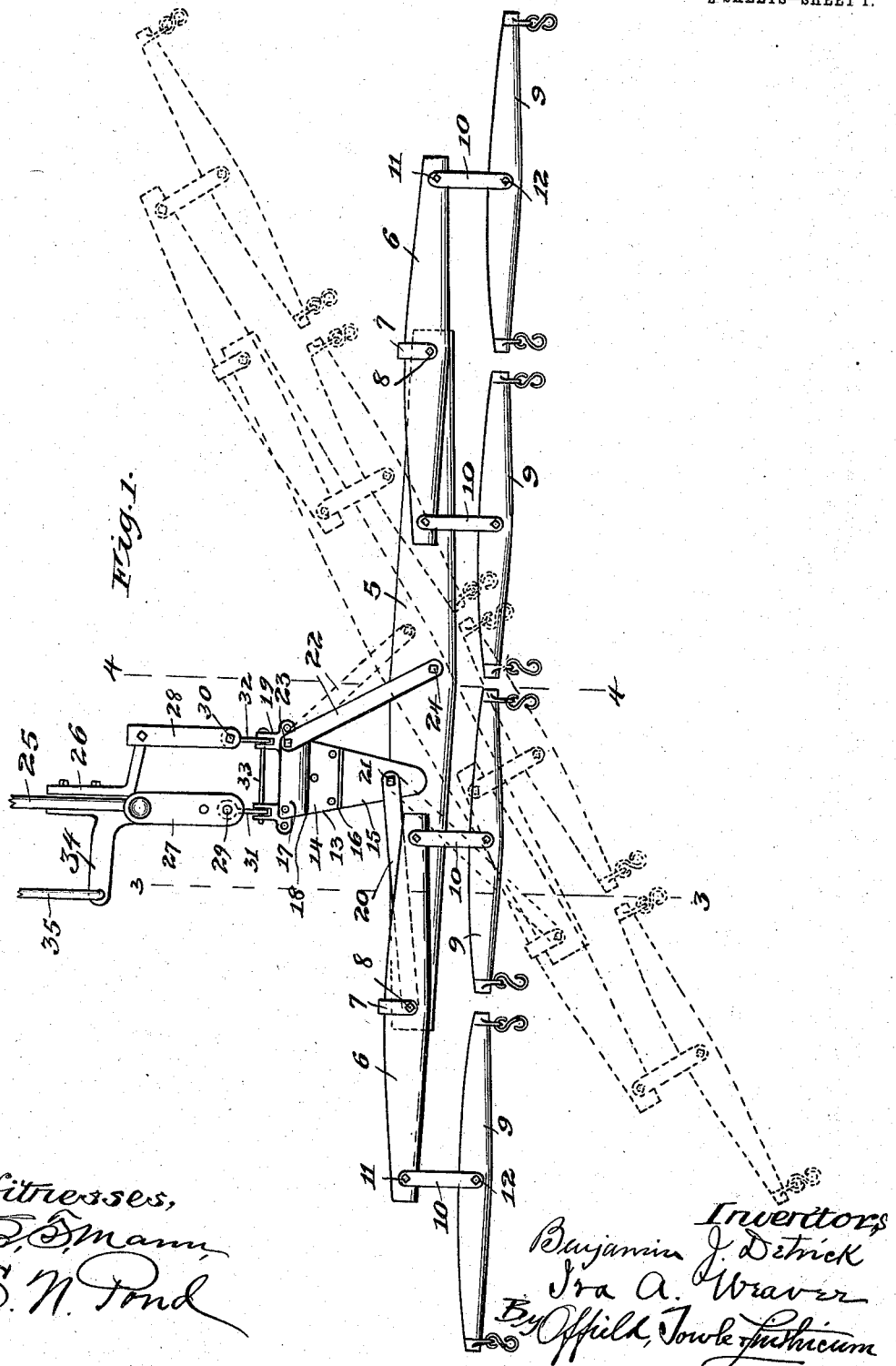

UNITED STATES PATENT OFFICE.

BENJAMIN J. DETRICK AND IRA A. WEAVER, OF SPRINGFIELD, ILLINOIS; SAID WEAVER ASSIGNOR TO SAID DETRICK.

DRAFT-EQUALIZER.

No. 840,755.     Specification of Letters Patent.     Patented Jan. 8, 1907.

Application filed September 19, 1906. Serial No. 335,264.

*To all whom it may concern:*

Be it known that we, BENJAMIN J. DETRICK and IRA A. WEAVER, citizens of the United States, and residents of Springfield, in the county of Sangamon and State of Illinois, have invented certain new and useful Improvements in Draft-Equalizers, of which the following is a specification.

This invention relates to draft-equalizers, and more particularly to that type or class of such devices as are commonly employed in connection with agricultural implements, especially sulky and gang plows operated by three or four horses traveling abreast. Where a team is thus employed, it is desirable to so direct and apply the draft strains of the team as to enable one outer horse to travel in the furrow previously made by the plow, while the rest of the team travels on the unbroken or land side of the furrow. As this ordinarily throws the line of resistance of the plow somewhat to one side of the central line of draft of the team, the natural tendency is to crowd the team toward the plowed side of the ground.

One object of our invention, therefore, is to provide an improved construction of draft-equalizer adapted to resist this tendency to crowd the furrow-horse over onto the plowed ground.

Another object of the invention is to provide a shorter connection between the equalizer-bar and the plow-beam than has heretofore been possible and one which is adapted to facilitate the turning movement of the team within a comparatively small space, which object is accomplished by a construction permitting the connection-piece to which the clevis is attached to overlap the equalizer-bar and the latter to assume comparatively sharp angles with the draft-beam of the plow or other implement to which it is attached.

Still another object of the invention is to provide an improved connecting means between the equalizer-bar and the plow or other implement designed to permit lateral or sidewise movement of the clevis relatively to the plow-beam without angular movement of the latter—in other words, to permit the clevis to move laterally into positions which are always parallel with each other.

Our invention will be readily understood when considered in connection with the accompanying drawings, illustrating a preferred embodiment thereof, in which—

Figure 1 is a plan view of the equalizer-bar and its immediate connections to the beam of the plow or other implement to which it is attached, the angular position of the equalizer-bar being shown in dotted lines. Fig. 2 is an end elevational view of the parts shown in Fig. 1, and Figs. 3 and 4 are cross-sectional views on the lines 3 3 and 4 4 of Fig. 1 looking in the directions indicated by the arrows.

Referring to the drawings, 5 designates the equalizer-bar, which is preferably a solid beam.

6 designates the usual doubletrees pivoted to the ends of the equalizer-bar by the usual clips 7 and pivot-bolts 8, and 9 designates the usual swingletrees pivotally connected to the ends of the doubletrees 6 by the links 10 and pivot-bolts 11 and 12.

13 designates, as an entirety, a connection-piece that is located between the rear side of the equalizer-bar 5 and the cross-clevis. This connection-piece, the constructional characteristics of which constitute an important feature of our invention, is adapted to overlap or intersect the equalizer-bar at its forward end and for this purpose may be conveniently formed, as herein shown, by a pair of comparatively thin metal plates, the intermediate portions of which (indicated at 14) are riveted together, as shown, the forward portions 15 being laterally spread or offset, as indicated at 16, so as to overlap the equalizer-bar on both sides, and the rear portions 17 being also laterally spread or offset, as indicated at 18, but to a less extent, to accommodate between them the forward apertured end of the cross-clevis 19.

A pair of links 20 pivotally connect the forward end of the connection-piece 13 with one end of the equalizer-bar 5, said links being pivoted to the forward offset portions 15 of the connection-piece by the pivot-bolts 21 and being pivoted to the equalizer-bar by the pivot-bolt 8 of the doubletree 6. Another pair of links 22 similarly connect the rear portion of the connection-piece 13 with the equalizer-bar at approximately the longitudinal center of the latter, said links being connected to the rear offset portion 17 of the connection-piece by the bolts 23 and to the equalizer-bar by a through-bolt 24. It will thus be seen that the two-part links 20 and 22, like the forward end of the connection-piece 13, partially overlap or embrace the sides of the equalizer-bar 5, thus enabling the latter to be set closer to the connection-piece and clevis than has heretofore been possible in connections of this kind.

The connection-piece 13 has a two-point connection to the clevis 19, which latter in turn has a two-point connection to the plow-beam, (indicated at 25,) so that the connection-piece is held against angular movement relatively to the plow-beam. The links 20 and 22 thus coöperate with the angularly-rigid connection-piece 13 in resisting endwise thrust of the equalizer-bar arising from the fact that the central line of resistance of the plow does not coincide with the central line of draft of the team, and thus prevents the crowding of the "off" horse over onto the plowed ground. At the same time the described connections permit the equalizer-bar to assume a relatively sharp angle to the connection-piece for turning the team around, as indicated in dotted lines in Fig. 1.

Referring now to the connection between the clevis and the plow-beam for permitting sidewise swing of the clevis without angular movement thereof, which is especially applicable to sulky-plows, 26 may designate an angle-bracket bolted to one side of the plow-beams 25. Pivoted to the forward end of the plow-beam and to the end of the laterally-projecting arm of the bracket 26 are two pairs of links 27 and 28, respectively, and between the outer ends of each pair of links are mounted on vertical pivots 29 and 30 vertical clevises 31 and 32, to which the horizontal clevis 19 is connected by the horizontal pivot-bolt 33. Integral with one of the links 27 (herein shown as the lower) is a laterally-projecting arm 34, to which is connected a rod 35, that extends back and is directly or indirectly connected to a suitable operating-lever (not shown) within reach of the operator.

It will be obvious that a pull or thrust upon the rod 35 will swing the links 27 and 28 angularly to one side or the other always in parallelism to each other, which action obviously prevents angular movement of the cross-clevis 19 and insures its bodily lateral movement always in positions which are parallel to each other. This lateral shifting of the clevis is frequently desirable to correct occasional tendencies of the plow to swing unduly to one side or the other.

We claim—

1. In a draft-equalizer, the combination with a draft-bar, of a connection-piece capable at its forward end of overlapping the draft-bar, means for holding said connection-piece against angular movement, and links connecting separated points on said connection-piece with the draft-bar at approximately the longitudinal center and one end of the latter, respectively, substantially as described.

2. In a draft-equalizer, the combination with a draft-bar, of a connection-piece open at its forward end and capable of overlapping the sides of the draft-bar, means for holding said connection-piece against angular movement, and links connecting separated points on both sides of said connection-piece with both sides of the draft-bar at approximately the longitudinal center and one end of the latter, respectively, substantially as described.

3. In a draft-equalizer, the combination with a draft-bar, of a connection-piece capable at its forward end of overlapping the draft-bar, means for holding said connection-piece against angular movement, a link connecting the forward portion of said connection-piece with one end of the draft-bar, and another link connecting the rear portion of said connection-piece with the draft-bar near the longitudinal center of the latter, substantially as described.

4. In a draft-equalizer, the combination with a draft-bar, of a connection-piece open at its forward end and capable of overlapping the sides of the draft-bar, means for holding said connection-piece against angular movement, a pair of links connecting the opposite sides of the forward portion of said connection-piece with the opposite sides of one end of the draft-bar, and another pair of links connecting the opposite sides of the rear portion of said connection-piece with the opposite sides of the draft-bar near the longitudinal center of the latter, substantially as described.

5. In a draft-equalizer, the combination with a draft-bar, of a connection-piece consisting of a pair of metal plates secured together and having laterally-offset forward end portions adapted to overlap the sides of the draft-bar and laterally-offset rear portions adapted to embrace the cross-clevis of a plow or like implement, a pair of links connecting the offset forward portions of the connection-piece with the opposite sides of one end of the draft-bar, and another pair of links connecting the offset rear portions of the connection-piece with the opposite sides of the draft-bar near the longitudinal center of the latter, substantailly as described.

6. The combination with a clevis and a plow-beam, of a connection between said parts permitting lateral bodily movement of said clevis but preventing angular movement thereof, substantially as described.

7. The combination with a clevis and a plow-beam, of a pair of links pivotally connected at their opposite ends to laterally-separated points on said clevis and plow-beam, respectively, whereby said clevis is permitted a lateral bodily movement but is prevented from angular movement, substantially as described.

8. The combination with an equalizer-bar, and a connection-piece, of links connecting the latter to said equalizer-bar in a manner to resist endwise thrust of the latter under draft of the team, a clevis, and means connecting the latter to the plow or other implement permitting bodily lateral movement of said clevis and connection-piece but preventing angular movement thereof, substantially as described.

9. The combination with an equalizer-bar, and a connection-piece, of links connecting the latter to said equalizer-bar in a manner to resist endwise thrust of the latter under draft of the team, a cross-clevis connected to the rear end of said connection-piece, a plow-beam, a pair of links pivotally connected at their opposite ends to laterally-separated points on said cross-clevis and plow-beam, respectively, and means under control of the operator for swinging said last-named links on their pivotal connections to the plow-beam, whereby said cross-clevis and connection-piece may be moved laterally without angular movement, substantially as described.

BENJAMIN J. DETRICK.
IRA A. WEAVER.

Witnesses:
M. A. McCUTCHEN,
J. F. McLERMAN.